United States Patent [19]
Singh et al.

[11] Patent Number: 5,846,894
[45] Date of Patent: *Dec. 8, 1998

[54] PHOSPHATE BONDED STRUCTURAL PRODUCTS FROM HIGH VOLUME WASTES

[75] Inventors: Dileep Singh, Naperville; Arun S. Wagh, Joliet, both of Ill.

[73] Assignee: The University of Chicago, Chicago, Ill.

[ * ] Notice: The term of this patent shall not extend beyond the expiration date of Pat. No. 5,645,518.

[21] Appl. No.: 619,945

[22] Filed: Mar. 18, 1996

[51] Int. Cl.$^6$ .......................... C04B 35/00; C04B 35/447
[52] U.S. Cl. ............................. 501/155; 588/10; 588/15; 588/252; 588/256; 588/249; 588/901; 252/62
[58] Field of Search ................................ 501/155; 588/10, 588/15, 249, 252, 256, 257, 901; 106/677, 697; 252/62

[56] References Cited

U.S. PATENT DOCUMENTS

| | | | |
|---|---|---|---|
| 4,432,666 | 2/1984 | Frey et al. | 106/697 |
| 5,482,550 | 1/1996 | Strait | 106/677 |
| 5,502,268 | 3/1996 | Cote et al. | 588/249 |
| 5,580,378 | 12/1996 | Shulman | 106/677 |
| 5,645,518 | 7/1997 | Wagh et al. | 501/155 |

OTHER PUBLICATIONS

CA 78:88360, "Waste solidification program, Evaluation of solidified waste products", nuclear Science abstracts, 26(23). (No Month) 1972.

Low–Temperature–Setting Phosphate Ceramics for Stabilizing DOE Problem Low–Level Mixed Waste (Part I—Material & Waste Form Department—Dileep Singh, Arun S. Wagh and Lerry Knox) and Part II Low–Temperature–Setting Phosphate Ceramics for Stabilizing DOE Problem Low–Level Mixed Waste (Performance Studies on Final Waste Forms)—Arun S. Wagh, Dileep Singh, Manish Sutaria, and Sara Kurokawa—Proceedings of Waste Management 94 Conference–Tucson, AZ—26 pages, Mar. 1994.

*Primary Examiner*—Michael Marcheschi
*Attorney, Agent, or Firm*—Cherskov & Flaynik

[57] ABSTRACT

A method to produce structural products from benign waste is provided comprising mixing pretreated oxide with phosphoric acid to produce an acid solution, mixing the acid solution with waste particles to produce a slurry, and allowing the slurry to cure. The invention also provides for a structural material comprising waste particles enveloped by an inorganic binder.

20 Claims, 1 Drawing Sheet

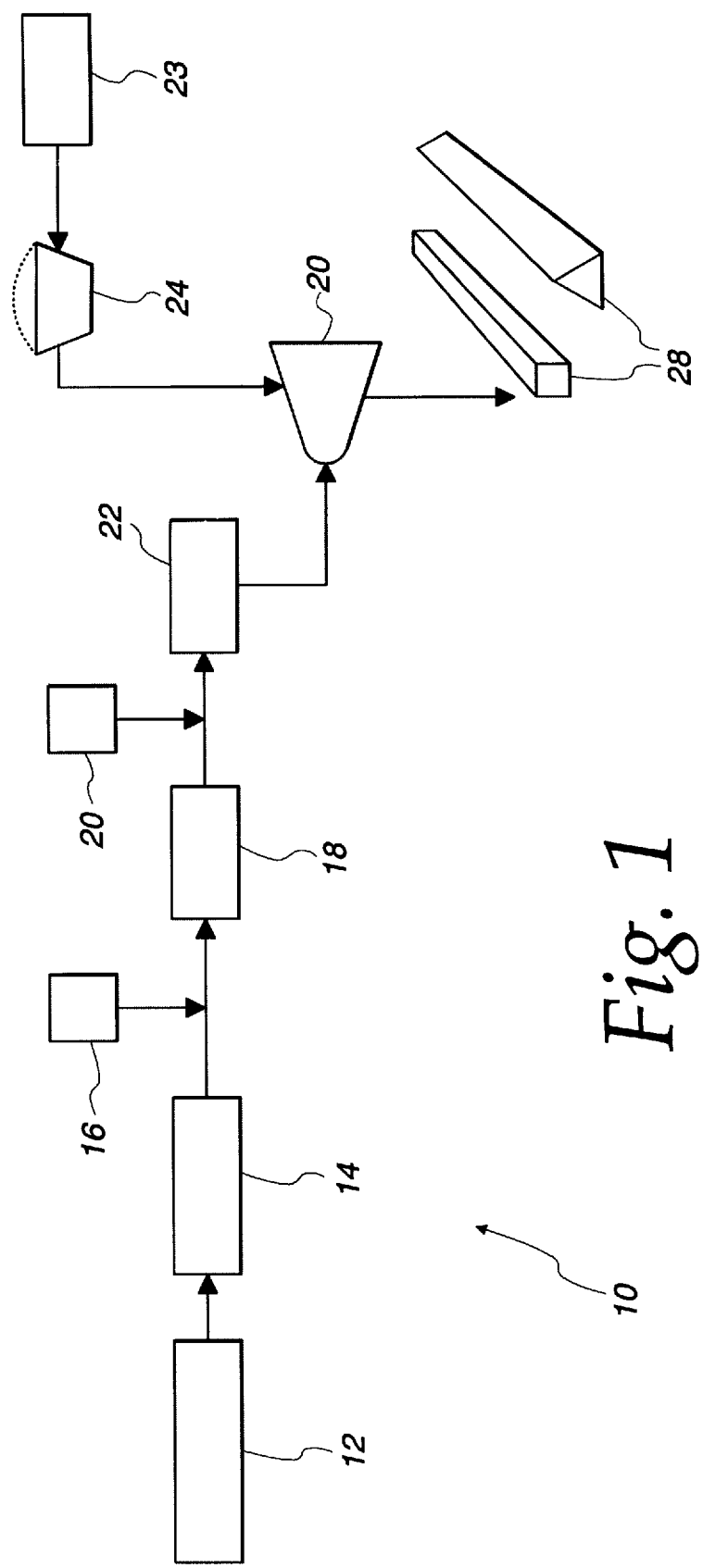

5,846,894

PHOSPHATE BONDED STRUCTURAL PRODUCTS FROM HIGH VOLUME WASTES

CONTRACTUAL ORIGIN OF THE INVENTION

The United States Government has rights in this invention pursuant to Contract No. W-31-109-ENG-38 between the U.S. Department of Energy and the University of Chicago, representing Argonne National Laboratory.

This patent application is related to co-pending application Ser. No. 08/380,922 filed on Jan. 31, 1995 entitled "METHOD FOR STABILIZING LOW-LEVEL MIXED WASTES AT ROOM TEMPERATURE U.S. Pat. No. 5,645,518."

BACKGROUND OF THE INVENTION

1. Field of the Invention

This invention relates to a method for producing structural materials and, more specifically, this invention relates to a method for producing structural products by binding benign wastes with a ceramic binder. The method is also applicable to producing a near term containment material.

2. Background of the Invention

The amount of available landfill space continues to dwindle. To preserve remaining space, recycling programs have been implemented to separate out reusable waste materials from materials that cannot be recycled, often at considerable expense. Despite these efforts, tipping fees continue to escalate, particularly because tremendous amounts of unrecyclable waste are still generated. Some examples of this waste include lumber waste, styrofoam, various kinds of cellulose fiber, automobile tires, ashes, used carpet backing, mineral wastes, and plastics. Ash, typically generated from incinerators, has extremely high disposal costs, partially due to the presence of heavy metals. Inked substrates, such as colored paper, colored fabrics, and synthetic fabrics pose recyclability problems. In addition to not being recyclable, many waste forms, such as plastics, or polymeric materials, also are not biodegradable.

A myriad of applications exist to convert many of these waste forms into usable products. However, many of the current methods incorporate organic compounds, such as formaldehyde, in polymeric binders. For example, organic binders are flammable, give off noxious fumes during setting, and have limited long-term stability. They are also expensive. Such methods are therefore unsuitable for housing applications.

Methods for encapsulating small amounts of low-level mixed wastes using ceramic binders also has been considered. However, those processes also are not suitable, primarily because they require high weight ratios of ceramic binder to waste forms. The inventors have found that high concentrations of binder leads to undesirably fast curing times, and therefore reduces the flowability characteristics of the slurry that are required for application in structural component and insulation substrate applications. Also, a high weight ratio of binder to waste particles connotes higher costs in that the space and economic advantages of disposing large volumes of benign waste with small amounts of binder are not realized.

A method for encapsulating waste using phosphate-containing material also is known in the art (U.S. Pat. No. Re. 32,329 to Paszner et al.). However, that process is relegated to porous vegetable matter, such as sugarcane, plant stalks and wood. The process also is designed to facilitate rapid setting of the final product, which is the antithesis of rendering a blowable or flowable mixture for use as a structural support or insulation product.

A need exists in the art for a method to utilize or otherwise dispose of nonrecyclable and non-biodegradable, benign waste without generating secondary waste streams. The method must be economical in providing structural materials for use in housing. A need also exists for an inexpensive structural product which is partially comprised of benign waste.

SUMMARY OF THE INVENTION

It is an object of the present invention to overcome many of the disadvantages of the prior art in the utilization of benign waste forms.

It is another object of the present invention to provide a method for utilizing benign waste. A feature of the invention is encapsulating and shaping the benign waste using a binder material. An advantage of the invention is conserving valuable landfill space.

Still another object of the present invention is to provide a method for producing a structural material. A feature of the invention is encapsulating benign waste using a nontoxic binder material. An advantage of the invention is utilizing the now encapsulated benign waste as safe insulative material and fire-proof material in housing and other structures. Another advantage of the invention is that the method does not emit noxious materials and therefore is safe for operators and end users.

Another object of the present invention is to provide a method for producing light-weight structural materials. A feature of the invention is the room-temperature encapsulation of large amounts of widely available wastes with relatively smaller amounts of an inorganic binder. An advantage of the invention is that it is an inexpensive process to utilize nonrecyclable waste material in blowable or pumpable preparations for ultimate use as housing materials.

Yet another object of the present invention is to provide a structural material partially comprised of benign waste. A feature of the invention is a high volume percent of waste to binder material. An advantage of the invention is the production of light weight, strong structural materials that can supplant traditional materials.

Another object of the present invention is to provide a method for producing a near-term containment material. A feature of the invention is using high weight ratios of the containment material to the invented binder. An advantage of the invented method is the ability to confine the near-term containment material to desired mold shapes or structures until most activity is reduced or dissipated.

Briefly, the invention provides for a method to produce structural products from benign waste comprising calcining an inorganic oxide, mixing the now-calcined oxide with a powdered acid to produce a mixture, contacting the mixture with phosphoric acid to produce an acid solution, mixing the acid solution with waste particles to produce a slurry or a wet mix, and allowing the slurry or mix to cure.

The invention also provides for a structural material comprising waste particles, and an inorganic binder enveloping the waste particles.

BRIEF DESCRIPTION OF THE DRAWING

These and other objects and advantages of the present invention will become readily apparent upon consideration of the following detailed description and attached drawing, wherein:

FIG. 1 is a schematic diagram of a method for producing ceramic bonded waste forms using benign material.

DETAILED DESCRIPTION OF THE INVENTION

The method described herein produces ceramically bound benign wastes for use as structural materials. Unlike previous attempts to produce stable structural materials from bulk waste, the instant process produces an amorphous, more flowable material by utilizing lower volume percents of binder to formulate the final forms. The resulting ceramic formulation is sufficiently amorphous and low in crystalline properties to insure good flow of the material and extended work time. The amorphous phase mimics polymeric formulations by facilitating the encapsulation of waste particles with binder during formation of the final slurry.

A myriad of benign wastes are utilized to produce the structural materials, including, but not limited to, lumber wastes, styrofoam, various cellulose fibers (including those fibers having colored ink), tires, textile wastes, ashes, carpet backing, mineral wastes, plastics and other solid materials that cease to be useful. These wastes are used in powder or shredded forms and are solidified by using a phosphate binder to form desired shapes for use in the construction industry. Products produced from the method include blowable insulation, particle boards, packaging materials, bricks, tiles, wall-forms and engineered barrier and shield systems.

The room-temperature setting phosphate ceramic waste forms are formulated by using a route of acid-base reactions. Oxides or hydroxides of various elements are used as starter powders for this purpose. Said oxides and hydroxides chemically react with phosphoric acid or soluble acid phosphates to form ceramics. When waste is mixed with these powders or acid components, the waste also may participate to form various stable phases in the final reaction product which then may be set into ceramic waste forms.

In one instance, the acid-base reaction results in the formation of the phosphate of MgO (Newberyite) via the following equation:

$$MgO + H_3PO_4 + 2H_2O \rightarrow MgHPO_4 \cdot 3H_2O \qquad \text{Equation 1}$$

The acid base reaction also results in the reaction of the waste components with the acid or acid-phosphates. These reactions lead to chemical solidification of the waste. In addition, encapsulation of the waste in the phosphate ceramics formed by the reaction products results in physical encapsulation of the waste components.

Oxide and Hydroxide Preparation

Oxide powders can be pretreated for better reactions with acids. One technique includes calcining the powders to a typical temperature of between approximately 1,200° C. and 1,500° C. and more typically 1,300° C. Another reaction enhancement technique is washing the powders with dilute nitric acid and then water. A myriad of oxide and hydroxide powders can be utilized to produce the ceramic system, including but not limited to MgO, Al(OH)$_3$, CaO, FeO, Fe$_2$O$_3$, Fe$_3$O$_4$ and Zr(OH)$_4$, ZrO, and TiO$_2$ and crushed dibasic sodium phosphate crystals mixed with MgO.

MgO and Al(OH)$_3$ powders are available through any commercial supply house, such as Baxter Scientific Products, McGaw Park, Ill. Zr(OH)$_4$ is obtained through Atomergic Chemetals Corporation, Farmingdale, N.Y.

A generic embodiment of the invented method is depicted in FIG. 1 as numeral 10. First, a supply of oxide 12 is subjected to either or both a calcining pretreatment step 14 and a boric acid addition step 16. Both steps serve to slow down the reaction mechanism. Generally, the boric acid is incorporated when a slower reaction is required, for example when extended workability of the material is desired. The inventors have found that the boric acid forms a glassy phase that coats the oxide particles so that the oxide cannot as readily react with phosphoric acid.

As discussed supra, a myriad of oxides can be used in the invented method. Any mixing of the oxide with the boric acid is strictly controlled to maintain an optimum weight percent of constituents of the resulting dry mixture. This weight percent is selected from a range of between approximately 5 weight percent boric acid to the oxide to 15 percent boric acid to the oxide. A preferable weight percent is 10 percent boric acid to oxide, e.g., 10 grams of boric acid for every 90 grams of oxide, to form the dry mixture.

The resulting dry mixture 18 is then mixed with between approximately 50 to 60 weight percent dilute phosphoric acid 20 to form an acid solution or binder 22. A preferable weight percent is at or below 55 percent, i.e., 55 grams of dry mixture to 45 grams of 50 percent dilute phosphoric acid, so as to facilitate flowability of the resulting solution. Concentrated acid tends to make the reaction more intense. This results in a thick slurry developing which is not conducive to coating the particles.

Waste particles, 24, which may be subjected to a pretreatment sizing process 23, are then thoroughly mixed with the binder. The mixing step 26 ensures that the waste particles are completely encapsulated or coated with binder. The resulting slurry is molded into desired shapes 28 under no pressure or under small pressure (approximately 1,000 pounds per square inch), depending on the waste material being bonded. For example, processes for encapsulating wood waste often requires the aid of pressurization, primarily because wood surfaces participate less in the ceramic formation reaction. Rather, bonding in such cases is purely from the phosphate phase encapsulating the wood particles. Compression also may be required to attain desired strengths of final products, such as in particle board manufacture.

Solid Waste Processing:

In solid waste processing scenarios, the waste streams are often manipulated in powder form by grinding the waste to an average, preferable approximate particle size of 8 to 10 micrometers ($\mu$m). However, particles can range in size from between approximately 4–75 $\mu$m.

Ash and cement wastes can be first mixed with the starter oxide or hydroxide powders using a vibratory shaker, or any conventional agitator. Weight percentages of the mixture varies at this juncture, but can range from between approximately 15 percent oxide to 50 percent oxide. Typically, an even weight percent (50:50) of oxide to solid waste is sought. However, the inventors have successfully encapsulated and stabilized single-component fly ash at weight percents as high as 85 percent ash to 15 percent MgO powder, which makes this technique particularly attractive for utilities where single-component fly ash is a major land-filling problem.

Typically, the rate of powder addition to the acid solution should result in the reaction liquor being maintained at less than 100° C. Typical times required for controlled mixing range from 30 minutes to 1 hour. Mixing times can be shortened if the heat from resulting exothermic reactions, associated with the above method, is dissipated via reaction vessel cooling. The inventors found that reaction vessel cooling is more likely to be necessary when the resulting oxide powder-solid waste mixture contains less than 50 weight percent of waste.

Alternatively, the reaction can be slowed with the addition of from 5 to 25 weight percent of boric acid in the powder, and preferably 10 weight percent.

Upon temperature equilibration, the reacted paste is a liquid slurry which sets in a few hours once poured into a mold. Typically, his slurry is mixed with shredded waste and put into a mold.

Mold shapes can vary, depending on the configuration of the ultimate deposition site, and can be selected from a myriad of geometrical shapes including cuboid, pyramidal, spherical, planar, conical, cylindrical, trapezoidal, rectangular, and the like.

Liquid Waste Forms

Sludges and benign wastes with high water content can be incorporated or bound using this binder system by appropriate modification to the water content in the acid.

The inventors have found that the volume of the loading of the wastes in the final product can range from between approximately 50–90 volume percent. For insulation and building reinforcement applications, the composition of the mixture is adjusted to convert it into a pumpable slurry (50 volume percent waste) or a blowable particle mixture (80–90 volume percent waste) so as to facilitate the filling of cavities.

The acid-base reaction between the oxide and phosphoric acid results in the formation of phosphates on the surface of the particles thereby encapsulating individual particles with a thin layer of impermeable phosphate binder. This results in a structural product in which particles of the waste are protected by the binder to provide not only product strength but also confers resistance to fire, chemical attack, humidity and other weathering conditions.

Several advantages of the resulting embodiment exist over commercially available polymer-based binders. Unlike polymer binders, phosphate binders are nonflammable. Also, several polymer ingredients are occupational hazards, whereas inorganic phosphate binders are comparatively safe. No toxic chemicals or vapors are released during production of phosphate bonded products. Lastly, phosphate based binder improves the rigidity and long-term stability to the structural product, compared to currently used organic binders.

EXAMPLE 1

Styrofoam Insulation

The inventors have found that utilizing the above-disclosed method, styrofoam particles are completely coated with a thin, impermeable layer of the phosphate binder phase. The uniform coating of the styrofoam particles not only provides structural stability but also confers resistance to fire, chemical attack, humidity and other weathering conditions. As shown in Table 1, below, these characteristics are superior to more typical insulation materials.

TABLE 1

Comparison of ceramic-bonded Styrofoam insulation to Fiber Glass- and Cellulose-insulation

| Key Features | Bonded Styrofoam | Fiberglass | Cellulose |
|---|---|---|---|
| Density (lb/ft$^3$) | 2.0 | 0.4–1.0 | 2–3.5 |
| R Values (1 in. thicknesses) | 4.5 | 2–3 | 3–3.5 |
| Fire Resistance | noncombustible | noncombustible | noncombustible |
| Water absorption | <4% | 1–2% | 5–20% |

TABLE 1-continued

Comparison of ceramic-bonded Styrofoam insulation to Fiber Glass- and Cellulose-insulation

| Key Features | Bonded Styrofoam | Fiberglass | Cellulose |
|---|---|---|---|
| Dimensional Stability | ≈2% | settling noted | ≈20% |
| Health Hazards | minimum | high | minimum |
| Material Costs | Low/blown or pumped | high | low |

As depicted in Table 1, the resulting binder-covered styrofoam material provided superior R values. For example, thermal conductivity measurements, utilizing a modified radial hot-wire technique (established by Anter Laboratories, Pittsburgh, Pa.) showed that the thermal resistance of the material produced via the invented method was approximately 4.5 hour square foot degrees Fahrenheit per British Thermal Unit (h.ft.$^2$°F./BTU, compared to 2–3 h.ft.$^2$°F./BTU for fiber glass and 3–3.5 h.ft.$^2$°F./BTU for cellulose. This superior R value indicates that phosphate ceramic binder-covered styrofoam provides superior energy savings when used as an insulation product.

Insulation products often are susceptible to humidity and tend to sag, thereby loosing their structural integrity over time. The invented material was subjected to an aging test pursuant to ASTM D 2126 (ASTM=American Society for Testing and Materials), whereby the material is exposed to severe environments for extended periods of time with dimension changes of the material closely monitored. The material was exposed to 38° C. temperatures at 98 percent humidity for 3 weeks. Specimen volume change was shown to be approximately two percent after a two week period. This compares to 20 percent for cellulose insulation material and is also superior to that seen in fiberglass material.

Generally, a wide range of waste particle sizes can be utilized when producing structural products using the invented method. When using styrofoam materials, optimal results are obtained when particle sizes ranging from 2 millimeters to 5 millimeters are used, and when the particles are mixed with binder in a weight ratio of 1:2. Optimal weight loading of the styrofoam in the final product is approximately 7.5 weight percent, which corresponds to approximately 85 to 90 volume percent of the final product.

EXAMPLE 2

Wood Waste

The inventors have found that when wood waste is subjected to the invented method, particle board having superior flexural strength values is produced. For example, samples containing 50 weight percent of wood and 50 weight percent of binder display approximately 1,500 psi in flexural strength. Samples containing 60 weight percent and 70 weight percent of wood exhibit flexural strengths of 400 psi and 300 psi, respectively.

Generally, suitably sized wood particles range from between approximately 1 and 5 millimeters (mm) long, 1 mm thick and 2 to 3 mm wide.

In addition, once the wood and binder is thoroughly mixed, the samples are subjected to pressurized molding on the order of approximately 2650 psi, and for approximately 30 to 90 minutes.

The disclosed process is not be construed as limited to the above examples. Also, aside from the myriad of wastes listed above for which this process can be used to encapsulate, other waste streams are also sufficiently stabilized herewith. For example, potliner residue, Bayer sands, ashes generated at plant sites and any other mining refuse can be stabilized by this process and utilized as structural components. Potliner residue, when combined with magnesium phosphate hexahydrate in a 50:50 weight proportion, yields a ceramic form having a density of 2.9 grams per cubic centimeter, a porosity of 2.17 percent and a compressive strength of 4,210 psi, the last of which is comparable to portland cement forms. Consistent with data disclosed supra, when higher proportions (60 weight percent) of waste material (in this instance potliner residue) is used, desired values degraded slightly from those values obtained when 50 weight percent loadings were used. Density decreased to 2.0 grams per cubic centimeter, porosity increased to 2.6 percent and compression strength decreased to 3,402 psi.

While the invention has been described with reference to details of the illustrated embodiment, these details are not intended to limit the scope of the invention as defined in the appended claims.

The embodiment of the invention in which an exclusive property or privilege is claimed is defined as follows:

1. A method to produce structural products from nonrecyclable and nonbiodegradable waste comprising:
    a.) preparing an inorganic oxide;
    b.) contacting the prepared inorganic oxide with phosphoric acid to produce an acid solution;
    c.) mixing the acid solution with waste particles to produce a slurry; and
    d.) allowing the slurry to cure.

2. The method as recited in claim 1 wherein the inorganic oxide is an oxygen-containing compound selected from the group consisting of MgO, Al(OH)$_3$, Zr(OH)$_4$, CaO, iron oxide, crushed dibasic sodium phosphate crystals mixed with MgO, and combinations thereof.

3. The method as recited in claim 1 wherein the step of preparing an inorganic oxide further consists of calcining the oxide.

4. The method as recited in claim 1 wherein the step of preparing an inorganic oxide further consists of calcining the oxide and then mixing the calcined oxide with boric acid to form a mixture having a weight ratio of oxide to the boric acid of between approximately 5:95 and 15:85.

5. The method as recited in claim 4 wherein the mixture of inorganic oxide and boric acid is contacted with the phosphoric acid to form an acid solution having a mixture to phosphoric acid weight ratio of between approximately 50:50 and 60:40.

6. The method as recited in claim 4 wherein the mixture of inorganic oxide and boric acid is contacted with the phosphoric acid to form an acid solution having a mixture to phosphoric acid weight ratio of approximately 55:45.

7. The method as recited in claim 1 wherein the acid solution in the slurry is present in a weight ratio to the waste particles in the slurry of between approximately 2.5:97.5 and 15:85.

8. The method as recited in claim 1 wherein the acid solution in the slurry is present in a weight ratio to the waste particles in the slurry of approximately 15:85.

9. A structural material comprising:
    a.) nonrecyclable or nonbiodegradable waste particles; and
    b.) a premixed ceramic-based inorganic binder enveloping the waste particles, wherein no more than 55 percent of said binder comprises a powder mixture.

10. The structural material as recited in claim 9 wherein the waste particles have a size of between approximately 4 and 75 $\mu$m.

11. The structural material as recited in claim 9 wherein the waste particle is bulk material which comprises ash or potliner residue or wood or plastic or rubber or cellulose or textile products or styrofoam or combinations thereof.

12. The structural material as recited in claim 9 wherein the inorganic binder is a phosphate ceramic.

13. The structural material as recited in claim 12 wherein the phosphate ceramic further contains an element selected from the group consisting of magnesium, sodium, aluminum, zirconium, and combinations thereof.

14. The structural material as recited in claim 12 wherein the phosphate ceramic is magnesium phosphate hexahydrate.

15. The structural material as recited in claim 9 wherein the waste comprises between 80 to 90 volume percent of the material.

16. The structural material as recited in claim 9 wherein the binder is present in a binder to waste weight ratio of between approximately 2.5 percent and 15 percent.

17. A nonflammable structural material comprising:
    a.) styrofoam particles; and
    b.) a ceramic-based inorganic binder enveloping the styrofoam, wherein no more than 55 percent of said binder comprises a powder mixture.

18. The structural material as recited in claim 17 wherein the particles have a size of between approximately 2 millimeters and 5 millimeters.

19. The structural material as recited in claim 17 wherein the styrofoam is present at a volume percent of approximately 80 to 90 percent of the structural material.

20. The structural material as recited in claim 17 wherein the structural material is insulation having an R value greater than 4 for a 1" thickness.

* * * * *